Dec. 7, 1943.　　J. R. URSCHEL ET AL　　2,335,891
STRING BEAN GRADER
Filed Aug. 17, 1940　　3 Sheets-Sheet 1
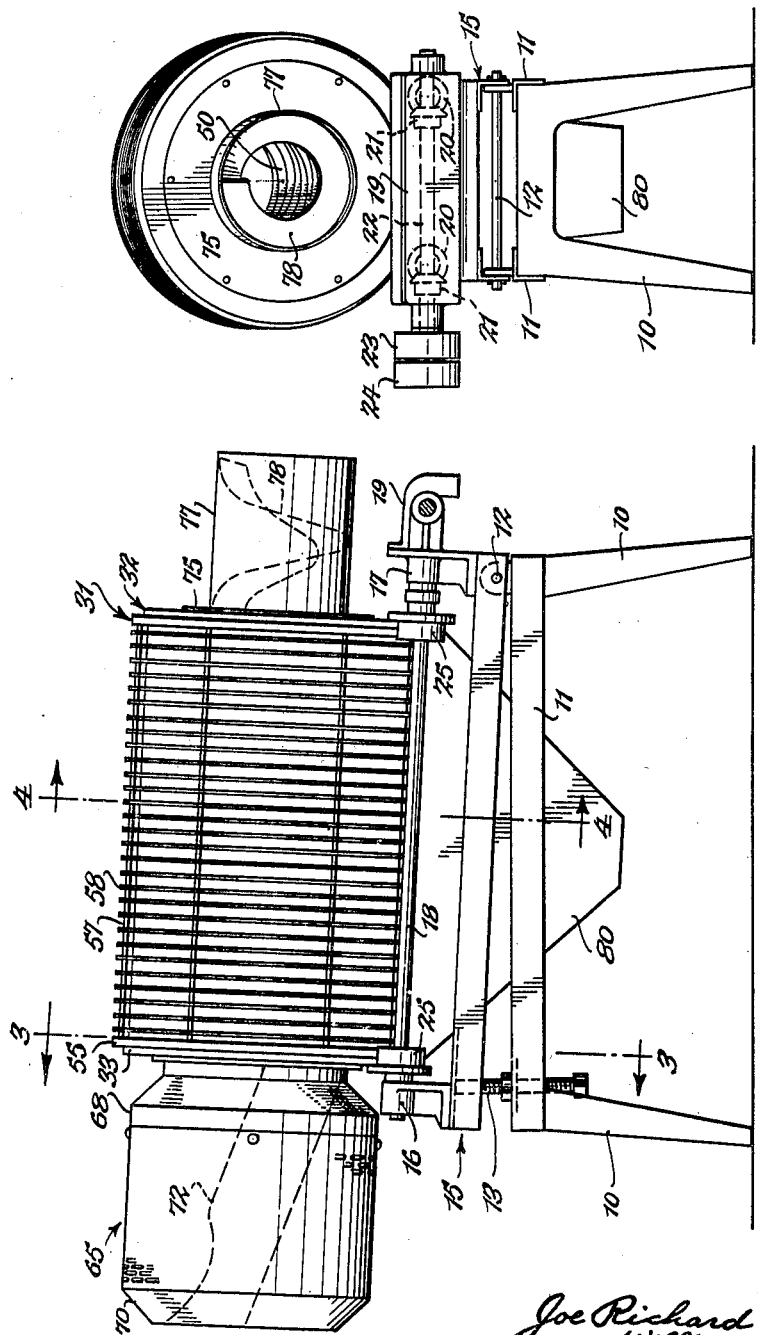
INVENTOR
Joe Richard Urschel and
William de Back
BY
Popp and Popp
ATTORNEYS Dec. 7, 1943.  J. R. URSCHEL ET AL  2,335,891
STRING BEAN GRADER
Filed Aug. 17, 1940  3 Sheets-Sheet 2
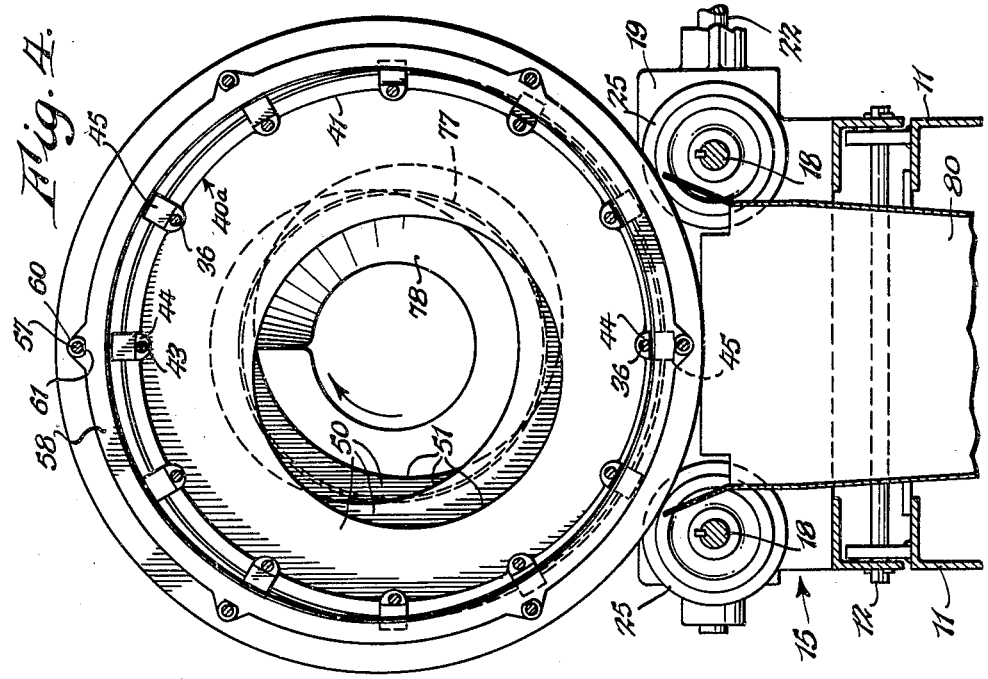
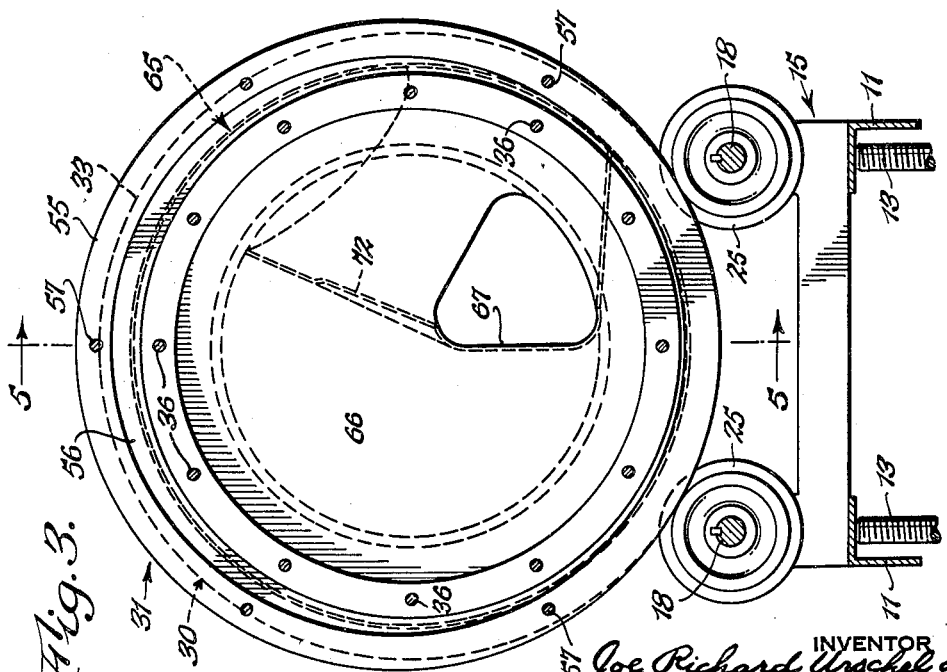
INVENTOR
Joe Richard Urschel and
William de Back
BY
Poggs and Poggs
ATTORNEYS Dec. 7, 1943.   J. R. URSCHEL ET AL   2,335,891
STRING BEAN GRADER
Filed Aug. 17, 1940   3 Sheets-Sheet 3
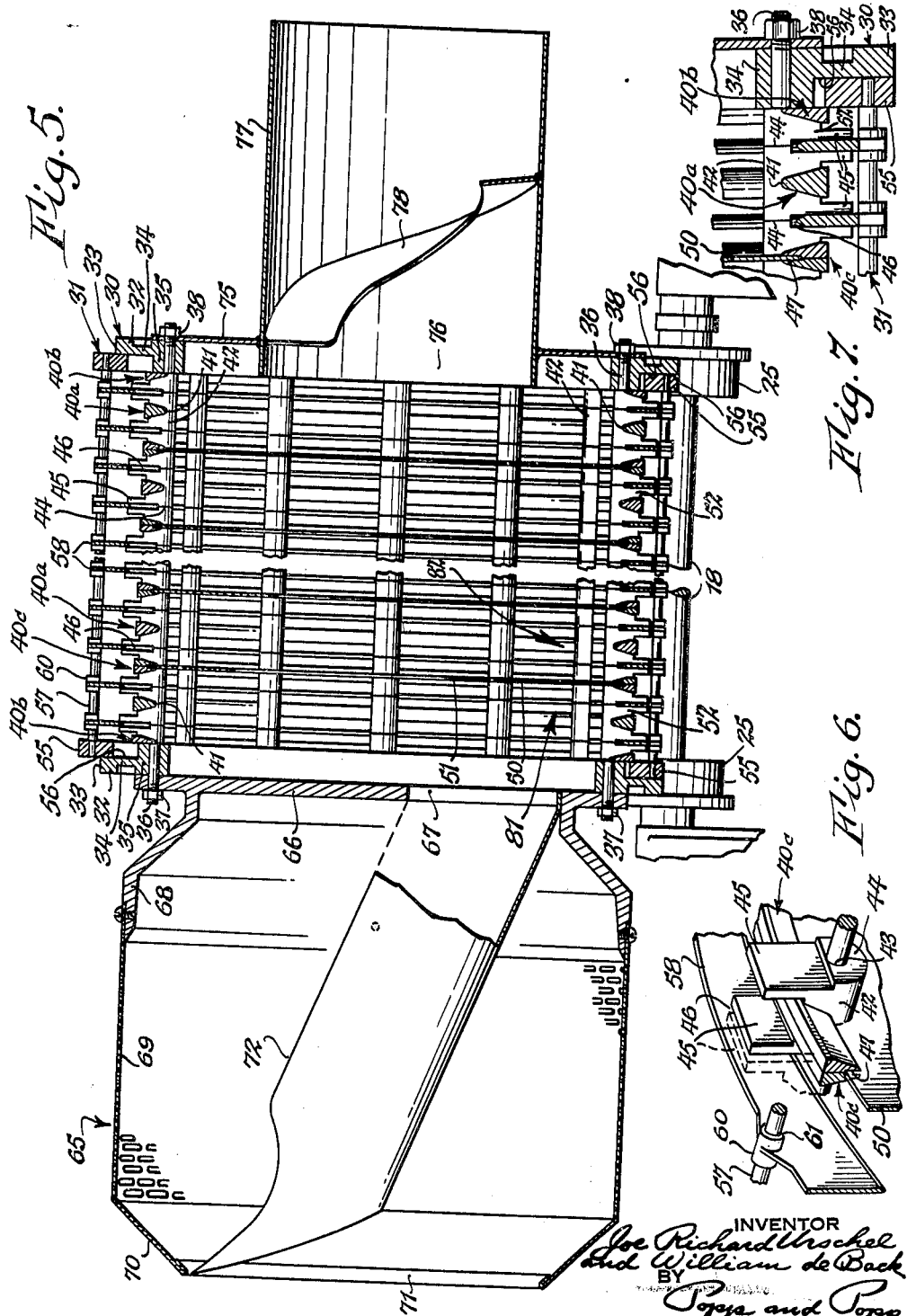

Patented Dec. 7, 1943

2,335,891

UNITED STATES PATENT OFFICE 2,335,891

STRING BEAN GRADER

Joe Richard Urschel, Valparaiso, Ind., and William de Back, Niagara Falls, N. Y., assignors to Chisholm-Ryder Company, Incorporated, Niagara Falls, N. Y., a corporation of New York Application August 17, 1940, Serial No. 353,104

4 Claims. (Cl. 209—98)

This invention relates to a string bean grader and more particularly to a string bean grader of the general type shown and described in the Urschel Patent No. 1,295,642, dated February 25, 1919.

String bean graders of this type are designed to sort string beans into the different sizes required by canneries. Such sorting or grading of string beans takes no account of the length of the bean but only of its thickness and the grading is effected by having opposing gaging surfaces in the grader with slots sufficiently long to freely permit all beans to pass therethrough lengthwise and exactly broad enough to just permit the thickness or belly of the bean of the desired grade to pass therethrough crosswise or transversely and to stop from passage all larger beans.

One of the principal objects of the string bean grader forming the subject of the present invention is to provide such a grader having increased efficiency in the separation of the size of the beans which the grader is designed to separate and to provide such a grader having a capacity greatly in excess of graders of this general type as heretofore constructed.

Another object of the invention is to provide such a grader which consists of two interlaced cylindrical cages, each of the cages being composed of simple endless or continuous rings interconnected by tie rods, which rings can be produced at low cost and can be readily assembled to form the cylindrical cages.

Another object of the invention is to provide, in combination with certain of the rings of one of said cages, internal baffle plates of annular form, each having an opening centrally of the longitudinal axis of the cage and wherein the openings through the several annular baffle plates are out of register, thereby providing a staggered arrangement of spaced circular openings. These baffles form a series of annular pockets lengthwise of the cylindrical cage and serve to retard the passage of the beans through the cylindrical cages and operate to mass the beans and to cause them to be tumbled around within each pocket in being transferred from each pocket to the next, thereby to facilitate the discharge of the size of the beans to be separated through the gage slots provided in the two cylindrical cages.

Another object of the invention is to provide such a grader in which the rate of passage of the beans through the grader cylinder formed by the interlaced cylindrical cages can be controlled by the simple expedient of adjusting the inclination of the cylinder.

Other objects of the invention are to provide such a bean grader which is simple and inexpensive in construction, can readily be kept in a clean and sanitary condition and will stand up under conditions of severe and constant use without getting out of order or requiring repairs.

In the accompanying drawings:

Fig. 1 is a side elevation of a string bean grader made in accordance with our invention.

Fig. 2 is an end view thereof, viewed from the discharge end of the grader.

Figs. 3 and 4 are fragmentary, vertical, enlarged sections, taken on the correspondingly numbered lines of Fig. 1.

Fig. 5 is a fragmentary, vertical, central, longitudinal section, taken on line 5—5, Fig. 3.

Fig. 6 is a fragmentary, perspective view of the rings of the two cylindrical cages and showing the manner in which these rings are connected together to form the cylindrical cages and the manner in which the rings are guided by one another.

Fig. 7 is an enlarged, fragmentary view similar to Fig. 5 and showing the lower left hand corner of the grader cylinder as viewed in Fig. 5.

In its general organization the present invention comprises a rotatable grader cylinder composed of two interlaced cylindrical cages, each composed of a plurality of endless or continuous rings, the two cages being mounted eccentrically with respect to each other and both cylindrical cages being supported on the same supporting rollers. The arrangement of the several rings of these interlaced cylindrical cages is such that the faces of the rings of one cylindrical cage form with the opposing faces of the rings of the other interlaced cylindrical cage, a row of elongated gage slots extending parallel with each ring on each side thereof, these slots being provided along the full length of the grader cylinder. While these slots are arranged to be of the exact gaging width in the lower half of the grader cylinder, the arrangement causes one of the cylindrical cages to be displaced with reference to the other in the upper half of the grader cylinder so as to displace the opposing faces of the rings of one cylindrical cage with respect to the rings of the other cylindrical cage, whereby the gaging slots increase in width at the top of the grader cylinder sufficiently to form broad openings from which any beans which happen to have become clogged in the slot when it was narrower, for gaging purposes, at the bottom, will fall from the broadened slot at the top of the grader cylinder. Thus, each circumferential gaging slot at the bottom becomes a circumferential releasing slot at the top of the grader cylinder. Certain of the rings of the inner cylindrical cage carry inwardly extending annular baffle plates each having a central opening through which the beans pass lengthwise of the grader cylinder and these openings are arranged out of register with one another, and in general spiral arrangement, thereby to form a series of annular pockets within the grader cylinder. The grader cylinder is inclined axially downwardly from its feeding end to its discharge end and the beans mass in each of these pockets, these masses of beans being carried upwardly in an arc around with the rotating grader cylinder to a point near the top of the cylinder whence they tumble back to the bottom of the pocket, certain of such beans falling into the next succeeding pocket because of the axial inclination of the grader cylinder. By arranging the openings through the several annular baffle plates out of register, long beans are prevented from passing axially without being graded through the cylinder on the edges of the baffle plates which form the openings therein.

As shown in the accompanying drawings, the grader is mounted on a table comprising end standards 10 connected by longitudinal angle bars 11. At one end this table carries a horizontal transverse pivot rod 12 and at its opposite end this table carries a pair of vertical adjusting screws 13 which are mounted so as to be screwed up or down relative to the table as they are turned. The grader cylinder is shown as carried by a rectangular frame 15 of any suitable construction, one end of this frame being pivotally supported by the ends of the horizontal pivot rod 12 and the other end of this frame being supported on the upper ends of the two screws 13. It will therefore be seen that the inclination of the frame 15 can be readily adjusted by the adjustment of the screws 13.

A bearing 16 is mounted on each of the upper corners of the frame 15 and similarly bearings 17 are mounted at the lower corners of this frame. Each corresponding pair of the bearings 16, 17 carries a shaft 18 which extends longitudinally of the frame 15 along one side thereof and the lower ends of these shafts project into a gear case 19 carried by the bearings 17. Within this gear case each of the shafts 18 is provided with a bevel gear 20, these bevel gears meshing with bevel gears 21 provided on a transverse drive shaft 22, this transverse drive shaft being suitably journaled in bearings provided at the ends of the gear case 19. One end of the transverse drive shaft 22 projects outwardly from the gear case and is provided with a drive pulley 23 and an idler pulley 24. At the inner side of each of the bearings 16, 17, the drive shafts 18 are provided with flanged supporting rollers 25 upon which the cylindrical cages forming the grader cylinder are supported.

The grader cylinder comprises two interlaced cylindrical cages, the inner one of which is designated at 30 and the outer one of which is designated at 31.

The inner cylindrical cage 30 includes a pair of opposite end rings 32 each having an outer rim 33 riding on the supporting rollers 25, a web 34 and an axially elongated inner rim 35. These end rings are connected by a plurality of spaced tie rods 36, these tie rods being threaded at their ends and provided with nuts 37 and 38.

Upon these rods are strung a plurality of generally similar rings which are of three forms, the three forms of rings being designated at 40a, 40b, and 40c, respectively, the rings 40a being full rings, the rings 40b being half rings and the rings 40c being grooved half rings.

Each of the rings 40a is shown as being of rounded V-shaped form in cross section with its rounded edge 41 projecting inwardly, and as being formed at spaced intervals coinciding with the tie rods 36 with lugs 42, these lugs projecting inwardly from the ring and being provided with holes 43 which receive the tie rods 36 and also being extended laterally to provide end abutment faces 44. These lugs are also formed to provide outwardly projecting flanges 45 arranged on opposite sides of the ring and these flanges being each formed to provide one-half of a guide groove 46 for receiving and guiding the rings of the outer cylindrical cage 31.

Each of the rings 40b is identical with one-half of the ring 40a split radially through its inner rounded edges 41 and the same reference numerals have therefore been applied to the spacing lugs with which this ring is provided.

The rings 40c are identical to the half rings 40b except that they are provided with grooves 47 extending radially from their rounded edges 41, the grooves of adjacent rings 40c being adapted to receive and hold an inner annular baffle plate 50, each of these baffle plates being provided with a central opening 51 which are eccentrically arranged with reference to the axis of the inner cylindrical cage 30 and are arranged helically with reference to one another.

In assembling the inner cylindrical cage 30 the several rings 40a, 40b and 40c are strung upon the tie rods 36 with the abutting faces 44 of their lugs 42 in engagement with one another so as to provide grading spaces 52 between successive rings. The rings are arranged, starting from each end of the inner cylindrical cage, so that the flat face of one of the half rings 40b is arranged against the corresponding end face of the inner rim 35 of the adjacent ring 32. The lugs 42 of this half ring 40b are engaged by the corresponding lugs 42 of one of the whole rings 40a. The opposite sides of the lugs 42 of this whole ring 40a are engaged by the abutment faces of the lugs 42 of a grooved half ring 40c. The flat face of this grooved half ring 40c is engaged by the similar face of another grooved half ring 40c, this pair of the grooved half rings 40c thereby forming inner grooves 47 for receiving and supporting an annular abutment baffle plate 50. Between the half rings 40b at the opposite ends of the grader cylinder, the rings 40a alternate with a pair of the rings 40c to provide the completed inner cylindrical cage 30.

The outer cylindrical cage 31 includes a pair of opposite end rings 55 which engage inner flat faces 56 provided on the outer rims 33 and webs 34 of the end rings 32 of the inner cylindrical cage 30, and these end rings 55 of the outer cylindrical cage 31 are interconnected by a plurality of tie rods 57. Upon these tie rods 57 are strung a plurality of rings 58, and these rings 58 are arranged to slide in the grooves 46 provided between the opposing flanges 45 on the lugs 42 of the rings 40a, 40b and 40c of the inner cylindrical cage 30. To secure each of the rings 58 to the tie rods 57 these rings are provided with oppositely extending bosses 60 through openings in which these rods extend, and to provide clearance between these bosses 60 and the outer ends of the flanges 45 as the two cylindrical cages 30 and 31 rotate relative to each other, the inner sides of the bosses 60 are cut away to provide a flat 61. The rings 53 of the outer cylindrical cage 31 are of uniform thickness axially of these rings and are of substantial radial extent for a purpose as hereinafter described.

The beans are fed into the grader cylinder provided by the two cylindrical cages 30 and 31 through a feeding hopper indicated generally at 65 and comprising an annular end plate 66 secured to the end face of the inner rim 35 of the end ring 32 at the elevated end of the grader cylinder by the nuts 37 of the tie bolts 36. At one side this circular plate of the feeding hopper is formed to provide an opening 67 and this plate is also formed to provide an axially extending rim 68 which projects outwardly from the plate 66 concentric with the axis of the inner cylindrical cage 30 and carries a cylindrical screen 69. To the opposite end of the cylindrical screen 69 is secured a frusto-conical end plate 70 forming an inlet opening 71 into which the beans to be graded are dumped. These beans are picked up by a scoop 72 arranged within the feeding hopper 65 at an angle to its axis and which discharges these beans into the opening 67 so that each rotation of this feeding hopper effects the discharge of a batch of beans into the grader cylinder.

At the other end of this grader cylinder an annular plate 75 is secured to the end face of the inner rim 35 of the adjacent end ring 32 of the inner cylindrical cage 30 by the nuts 38 of its tie rods 36, this plate 75 having a large central opening 76 in which is secured a tubular discharge spout 77, this tubular discharge spout being arranged coaxially of the inner cylindrical cage 30. This tubular discharge spout 77 is internally provided with a helical conveyer plate 78 which discharges the oversize beans from the machine.

In operation the screws 13 are adjusted to set the grader cylinder at the desired angle for obtaining the desired movement of the beans through the grader cylinder and power is applied to the driving pulley 23 to rotate the cross shaft 22. Through the two pairs of bevel gears 20 and 21 the rotation of this cross shaft 22 rotates the two longitudinally shafts 18 and the rollers 25 mounted thereon. On these rollers are supported the end rings 32 and 55 of the inner and outer cylindrical cages 30 and 31, respectively. These cages are thereby rotated in the same direction but as the end rings 55 of the outer cylindrical cage 31 are larger than the corresponding end rings 32 of the inner cylindrical cage 30, these cages rotate around different axes. The outer cylindrical cage 31 will also have, of course, a slightly smaller angular speed than the inner cylindrical cage 30, this being, however, incidental. By reason of this vertical offset relation of the axes of the inner cylindrical cage 30 and the outer cylindrical cage 31, the rings 58 of the outer cylindrical cage 31 enter between the corresponding rings 40a, 40b and 40c in the lower half of the grader cylinder and are not withdrawn from between these rings 40a, 40b and 40c until the rings reach a level approximately horizontal with the axes of the two cylindrical cages as best shown in Fig. 3, this being due to the substantial radial dimension of each of the rings 58 of the outer cylindrical cage 31. Therefore, in the lower half of the grader cylinder only those beans having a thickness equal to or less than the axial distance between each of the rings 58 and the corresponding faces of the rings 40a, 40b and 40c will pass through the slots 52 in the inner cylindrical cage 30. These beans fall from the grader cylinder into a hopper 80.

By reason of the vertically offset relation of the axes of the cylindrical cages 30 and 31, the rings 58 of the outer cage 31 move out from between the rings 40a, 40b and 40c of the inner cylindrical cage 30 in the movement of these rings around the upper half of the grader cylinder. The spaces 52 between the ring 40a, 40b and 40c of the inner cylindrical cage 30 are thereby enlarged to their full size at the top of the grader cylinder and any oversize beans caught between the rings of the inner and outer cages 30 and 31 at the bottom of the grader cylinder are thereby released at the top of the cylinder and fall back into the mass of beans being conveyed through the grader cylinder. It will therefore be seen that although the slots 52 are arranged to be of the exact gaging width in the lower half of the grader cylinder, the difference in size of the two cylindrical cages causes the inner cylindrical cage 30 to be displaced with reference to the outer cylindrical cage 31 in the upper half of the grader cylinder so as to displace the gaging faces with respect to each other, whereby the gaging slots are caused to increase in width at the top of the grader cylinder sufficiently to form broad openings from which any beans which happen to have become clogged in the slot when it was narrower, for gaging purposes, at the bottom, will fall back into the grader cylinder. The width of the gaging slots between the rings of the inner and outer cylindrical cages 30 and 31 begin to open beyond their accurate bean gaging width at the bottom of the grader cylinder when the inner edges of the rings 58 of the outer cylindrical cages 31 pass beyond the outer faces of the rings 40a, 40b and 40c of the inner cylindrical cage 30, this being in a horizontal plane extending through the center of the grader cylinder.

The beans fed into the feeding hopper 65 are picked up in batches by the revolving scoop 72 therein, these batches being fed through the opening 67 into the first pocket 81 between the end plate 66 of the feeding hopper and the first annular baffle plate 50. This batch is received as a mass in the first bean pocket 81 and becomes wedged therein. Due to the wedging action of the beans between the side plates of this pocket, they are carried upwardly in mass formation as the grader cylinder rotates. When they reach approximately the top of the grader cylinder, the beans will drop again to the bottom of the pocket. Due to the tilt of the grader cylinder, a part of these beans drop into the second pocket 82. In this manner, the beans progress through the grader cylinder from its inlet to its outlet end. As each mass of beans is so lifted and dropped in each pocket the beans are tumbled about and by reason of this mass tumbling of the beans, the individual beans are rapidly brought into position to pass through the gaging slots at the bottom of the grader cylinder. The beans are thus fed with sufficient rapidity to form a mass of tumbling beans in each of the successive pockets formed by the annular baffle plates 50 in the grader cylinder, the mass of beans in each of these pockets being carried through an arcuate path tumbling from the top of each pocket to its bottom and into the next succeeding pocket so that the beans are tumbled about for efficient separation by the gaging slots of the grader cylinder and are also conveyed axially through the grader cylinder to the final pocket from which the oversize beans are picked up by the helical conveyer 78 within the discharge spout 77 and discharged from the machine.

As previously stated the openings 51 in the annular baffle plates 50 are out of register with one another and are preferably helically arranged, the openings 51 of each fourth annular baffle plate 50 being preferably in register with one another. If these openings were not arranged in such offset helical relation, that is, if these openings were in register, long beans could lie across or straddle the edges of the annular baffle plates 50 providing these openings 51 and in the rotation of the grader cylinder could pass directly to the discharge end without ever falling into the bean pockets for the purpose of being graded.

It will be understood that while a grader cylinder for separating a single size of beans has been shown, the rings of the cylindrical cages 30 and 31 of this cylinder could be so arranged in groups as to separate the beans into several sizes on passing through the grader cylinder and further, that the grader cylinders can be grouped in the manner set forth in the Urschel Patent No. 1,853,475, dated April 12, 1932, so that the beans are divided into the numerous grades demanded by the canner in a single machine.

From the foregoing it will be seen that the string bean grader forming the subject of this invention operates with high efficiency and at high capacity to grade string beans which can be admitted to the grader either before or after being snipped. Further, the construction of the inner cylindrical cage 30 of a plurality of substantially identical endless or continuous rings and the provision of grooves in certain of these rings to hold the annular baffle plates 50 provides a construction in which the parts are of simple and inexpensive form and in which the assembly of the parts is greatly facilitated as compared with rotary string bean graders of this type as heretofore constructed.

We claim as our invention:

1. A string bean grader, comprising a support, a plurality of rollers mounted on said support, an inner cage comprising end rings cradled on said rollers, a series of continuous, narrow, endless rings arranged coaxially of said end rings and being formed at spaced intervals with inwardly and laterally extending lugs, tie rods connecting said end rings and extending through apertures provided in said lugs to connect said end rings and continuous, endless rings, said lugs being provided with end abutting faces engaging with one another to space said continuous, endless rings and provide individual grading slots between said continuous, endless rings, an outer cage comprising end rings cradled on said rollers and having their axis disposed above the axis of said inner cage, a series of intermediate rings arranged coaxially of said last end rings and means connecting said intermediate rings with said last end rings and holding said intermediate rings spaced in a position interposed between said continuous, endless rings at the bottom of said cages to provide gaging slots determining the thickness of the beans to be separated, each of said lugs of said continuous, endless rings being provided with a radially outwardly extending flange, said flanges coacting to provide radial guideways receiving and guiding the intermediate rings of said outer cage, means for rotating said rollers and means for conveying the beans to be graded through said cages and over the rings thereof.

2. A string bean grader, comprising a support, a plurality of rollers mounted on said support, an inner cage comprising end rings cradled on said rollers, a series of continuous, narrow, endless rings arranged coaxially of said end rings and being formed at spaced intervals with inwardly and laterally extending lugs, tie rods connecting said end rings and extending through apertures provided in said lugs to connect said end rings and continuous, endless rings, said continuous, endless rings being each of rounding V-form in cross section with the rounding edge thereof projecting inwardly and said lugs being provided with end abutting faces engaging with one another to space said continuous, endless rings and provide individual grading slots between said continuous, endless rings, an outer cage comprising end rings cradled on said rollers and having their axis disposed above the axis of said inner cage, a series of intermediate rings arranged coaxially of said last end rings and means connecting said intermediate rings with said last end rings and holding said intermediate rings in a spaced position interposed between said continuous, endless rings at the bottom of said cages to provide gaging slots determining the thickness of the beans to be separated, said intermediate rings of said outer cage being each of uniform thickness axially thereof and of substantial radial extent thereby to accurately preserve the effective width of said gaging slots in substantially the entire lower half of said cages, each of said lugs of said continuous, endless rings being provided with a radially outwardly extending flange, said flanges coacting to provide radial guideways receiving and guiding the intermediate rings of said outer cage, means for rotating said rollers and means for conveying the beans to be graded through said cages and over the rings thereof.

3. A string bean grader having a grader cylinder including an inner cage comprising a series of continuous, narrow, endless rings arranged around a common axis and arranged parallel with one another and means for spacing said rings from one another to provide individual grading slots between said rings and an outer cage comprising a series of rings arranged around a common axis disposed above the axis of said inner cage and said rings of said outer cage being spaced and interposed between the rings of said inner cage at the bottom of said grader cylinder to provide gaging slots determining the thickness of the beans to be separated, means for rotatably supporting said cages on inclined parallel axes, means for rotating said cages about said axes and annular baffle plates arranged crosswise in said grader cylinder and secured at their edges to certain of said rings of said inner cylindrical cage, said annular baffle plates forming a series of annular pockets in said grader cylinder and being provided with central openings through which the beans travel toward the lower discharge end of said grader cylinder and said openings in said annular baffle plates being out of register with one another.

4. A string bean grader having a grader cylinder including an inner cage comprising a series of continuous, narrow, endless rings arranged around a common axis and arranged parallel with one another and means for spacing said rings from one another to provide individual grading slots between said rings and an outer cage comprising a series of rings arranged around a common axis disposed above the axis of said inner cage and said rings of said outer cage being spaced and interposed between the rings of said inner cage at the bottom of said grader cylinder to provide gaging slots determining the thickness of the beans to be separated, means for rotatably supporting said cages on inclined parallel axes, means for rotating said cages about said axes, certain of said rings of said inner cylindrical cage being split in a central radial plane and the two halves of each of said split rings being grooved to jointly provide an inwardly opening groove therein, and annular baffle plates arranged crosswise in said grader cylinder and having their edges secured in said grooves, said annular baffle plates forming a series of pockets in said grader cylinder and being provided with central openings through which the beans travel toward the lower discharge end of said grader cylinder and said openings in said annular baffle plates being out of register with one another.

JOE RICHARD URSCHEL.
WILLIAM DE BACK.